July 29, 1952 H. D. STEVENS 2,605,197
TIRE BUILDING MACHINE
Filed April 27, 1950 9 Sheets-Sheet 1

Fig.1.

Inventor
Horace D. Stevens
By Ely & Frye
Attorneys

July 29, 1952

H. D. STEVENS 2,605,197

TIRE BUILDING MACHINE

Filed April 27, 1950

Inventor
Horace D. Stevens
By Ely & Frye
Attorneys

July 29, 1952      H. D. STEVENS      2,605,197
TIRE BUILDING MACHINE Filed April 27, 1950      9 Sheets—Sheet 5

INVENTOR.
Horace D. Stevens
BY
*Ely & Frye*
ATTORNEYS

July 29, 1952   H. D. STEVENS   2,605,197
TIRE BUILDING MACHINE
Filed April 27, 1950   9 Sheets-Sheet 6

Inventor
Horace D. Stevens
By
Ely & Frye
Attorneys

July 29, 1952 H. D. STEVENS 2,605,197
TIRE BUILDING MACHINE
Filed April 27, 1950 9 Sheets-Sheet 7

INVENTOR.
Horace D. Stevens
BY Ely & Frye
ATTORNEYS

July 29, 1952     H. D. STEVENS     2,605,197
TIRE BUILDING MACHINE Filed April 27, 1950     9 Sheets—Sheet 8

INVENTOR.
Horace D. Stevens
BY
*Ely & Frye*
ATTORNEYS

July 29, 1952  H. D. STEVENS  2,605,197
TIRE BUILDING MACHINE
Filed April 27, 1950  9 Sheets-Sheet 9

Inventor
Horace D. Stevens
By Ely & Frye
Attorneys

Patented July 29, 1952

2,605,197

UNITED STATES PATENT OFFICE 2,605,197

TIRE BUILDING MACHINE

Horace D. Stevens, Sarasota, Fla., assignor to The Firestone Tire & Rubber Company, Akron, Ohio, a corporation of Ohio Application April 27, 1950, Serial No. 158,483

18 Claims. (Cl. 154—10)

This invention relates to a tire building machine, and more especially it relates to apparatus for fabricating pneumatic tire casings by the "flat band" method, and more particularly to ply stitching.

In the prior art, as exemplified in my Patent No. 2,381,379, tire building drums had an inwardly curved neck or apron on their end rims, against which the bead was laid, so that the bead lay at an acute angle to the drum axis. In building a tire, the first two plies were first turned inwardly on this apron, the bead was then applied, and the first two plies were then "turned up" to encase the bead. In order to initiate this "turn up" it was necessary to employ a non-rotating, plow-shaped element which was insertable between the first ply and the apron. Thereafter, some convenient form of roller stitcher was employed to complete the "turn up." The plow-shaped element has been found to be unsatisfactory for several reasons, among which are the undesirable wrinkling of plies and damage done to the ply fabric due to chafing. According to the present invention, the aprons on the drum rims are eliminated, the plies are turned down across the drum rims to a position radially of the drum axis, and "turn up," roller stitchers are provided which reach into the open ends of the drum to pick up the plies.

The chief object of the invention is to conserve time and manual labor in the manufacture of tire casings of the character mentioned. A further object of the invention is to provide a tire building machine in which hand stitching is avoided. Yet another object is to provide machine stitching of tire plies in which wrinkling and chafing are avoided. In greater particular, it is also an object to provide for machine stitching of tire plies in close quarters, as in the bead-covering operation.

The apparatus of the invention comprises a power-driven, reversible tire building drum of the type which is collapsible by means of a brake on the drum shaft and having bead-applying rings movable axially of the drum, on either side thereof. Endless belt spring stitchers are provided in front of the drum, for certain ply-turning operations, and novel, cone or "acorn" type stitchers are provided rearwardly of the drum for other ply-turning operations. The latter stitchers are mounted on a generally vertical axis for swinging motion into and out of the end openings of the drum, being arranged for clearing the rim of the drum in this movement, and are also of dual construction to perform different types of stitching, automatically selective in accordance with direction of drum rotation.

In greater particular, the invention is described in the following specification and illustrated in the drawings, in which:

Fig. 14 is a fragmentary view of a modified form of roller stitcher for use on the mounting shown in Figs. 2 to 5.

Viewed as a whole, the tire building machine comprises a power unit 1 for driving a collapsible drum 2, a base structure 3 supporting the stitching, trimming and bead-applying units, and a supply structure 4 by means of which the various tire elements, other than the beads, such as the plies, chafer strips, and tread strips, are made readily available to the operator.

Drum 2 is mounted on a cantilever shaft 6, for rotation therewith and shaft 6 is rotated by a prime mover (not shown) in the power unit 1. A bead-applying ring 7 is freely rotatable on a collar 8, which is keyed to shaft 6 in a slot 9 so as to be movable axially thereof, to approach drum 2 in applying a bead. Collar 8 has a split ring 11 engaged in a groove in its periphery and ring 11 has a downwardly extending arm 12 connected to the piston rod 13 of an air cylinder (not shown) in unit 1, so that the ring 7 may be moved to and from the drum. A handle 14 connects with a brake (not shown) which is associated with shaft 6 and is operative to collapse or expand drum 2 as required in the tire building process.

All of the foregoing elements include structure known in the art and, therefore, require no minute description.

The supply structure 4 may be of any known or preferred construction and comprises a housing which may be of the turntable type mounted on the base 23. In this structure are journaled pairs of rolls 21, 22. A supply of ply material and separating liner is wound on each roll 21 and the liner in each case is rewound on an adjacent roll 22, automatically, as the ply material is payed out from roll 21.

An apron 24 gives support to a ply as it is led from its roll to the drum, the apron being hingedly mounted on unit 4 so as to clear adjacent machinery when the supply unit is rotated, if the turntable type of supply mechanism is to be employed.

Other conventional mechanism may be included in structure 4 for supplying chafer strips and tread stock to the drum.

The mechanism supporting the tire building tools is mounted on a floor plate 31, together with the power unit 1. These tools comprise the outer bead applier, a pair of turn-down ply stitcher units located in front of the drum, and a pair of combined turn-down and turn-up stitchers located rearwardly of the drum. Also carried on the base are various foot switches, limit switches, air cylinders and a timer, all presently to be referred to as the description proceeds.

The bead-applying ring for the outer end of the drum, shown at 32, is carried on an upright arm 33 mounted on a plate 34 slidably mounted in undercut ways in a horizontal plate 37 supported on a framework comprising a bed plate 36 and upright plates 38, 39, 40. This type of support for the bead ring holder, comprising a long, upright arm, may result in slight misalignment in placing the bead on the drum. Therefore, centering guide means for the bead ring holder are provided in a female, tubular element 35 carried at the center of the bead ring holder, which is receivable on a male element 40 carried on the center shaft of drum 2 in coaxial relation thereto. The ends of elements 35 and 40 will preferably be beveled, to permit initiation of their telescopic engagement in cases where their axes may not be strictly aligned. An air cylinder 42, supported on plate 37, has a piston rod 43 secured to arm 33 of bead-holder 32 and adapted to move the bead-holder to and from the rim of the drum. Air cylinder 42 and the air cylinder which actuates bead-applying ring 7 are preferably both operated from a common source of pressure.

A pair of tread-stitcher discs 44, located beneath drum 2, are rotatably mounted in a pair of blocks 46, carried on piston rods of air cylinders 47 whereby the discs may be moved upwardly into contact with a tread when the latter is in place on the drum.

Air cylinders 47 are each attached to a block 48, threaded on a screw 49, journaled in support plates 38, 39, 40, the screw being oppositely threaded on each side of plate 39. Screw 49 is rotated by a motor 41 and gears 45, 50 and, in turning, effects separating movement of stitcher discs 44, axially outward of the drum in one direction of rotation of the screw, and return thereof in the other direction of rotation of the screw. During such axial movement blocks 48 are supported by rollers 51, running between rails 52, 53 carried by plates 38, 39, 40. A switch 54, carried on rails 52, 53, is operated by a portion of block 48 to reduce the speed at which tread stitchers move during that portion of their travel when the discs are moving off the inner crest of the tread strip. A switch 55, similarly mounted, stops travel of the tread stitchers and initiates their lowering and their return by suitable controls which need not be described in detail.

The pair of stitchers located in front of drum 2 are described and claimed in my co-pending application, Serial No. 158,482, filed April 27, 1950, now Patent No. 2,581,933, dated January 8, 1952, and reference is made thereto for more detailed description. For purposes of the present specification, it suffices to point out that the stitchers each comprise a unit 56, movable as a whole into contact with the drum periphery by means of an air cylinder 57, supported in a slanted position on a bracket 58, secured to middle plate 39 and to plate 36. The stitchers proper of each unit 56 comprise an endless, coil-spring belt 59, rotating on a pair of sheaves and adapted to contact a ply on the periphery of the drum at the edge thereof, and a second similarly mounted spring 61 with a backing roller under its span between the sheaves and adapted to pass over the edge of the drum to turn down the plies.

In the present machine, the inwardly directed apron, or neck, on the rim of the drum 2 has been eliminated and the rim of the drum is perpendicular to the drum axis. This is important, not only in the employment of the spring stitcher just mentioned but also in the operation of the novel stitcher located rearwardly of the drum, and involves a departure in the manner of laying the bead in the tire building process. A third element of the front spring stitcher comprises a roller stitcher 62 mounted for swinging movement on an arm 63 actuated by air cylinder 64 on unit 56. Roller 62 is intended for turn-down of the third and fourth plies and is used instead of a spring stitcher to enable higher drum speed.

Figure 1:
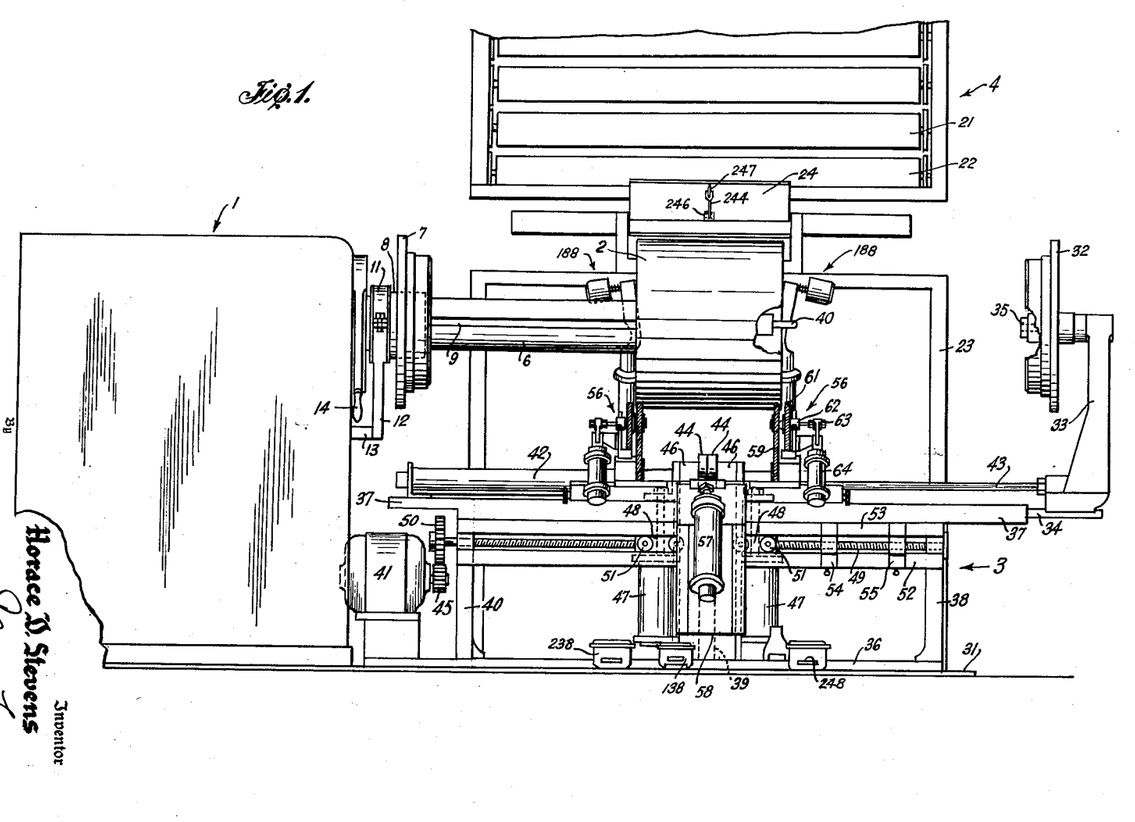
Fig. 1 is a front view of a tire building machine incorporating principles of the present invention.
Figure 2:
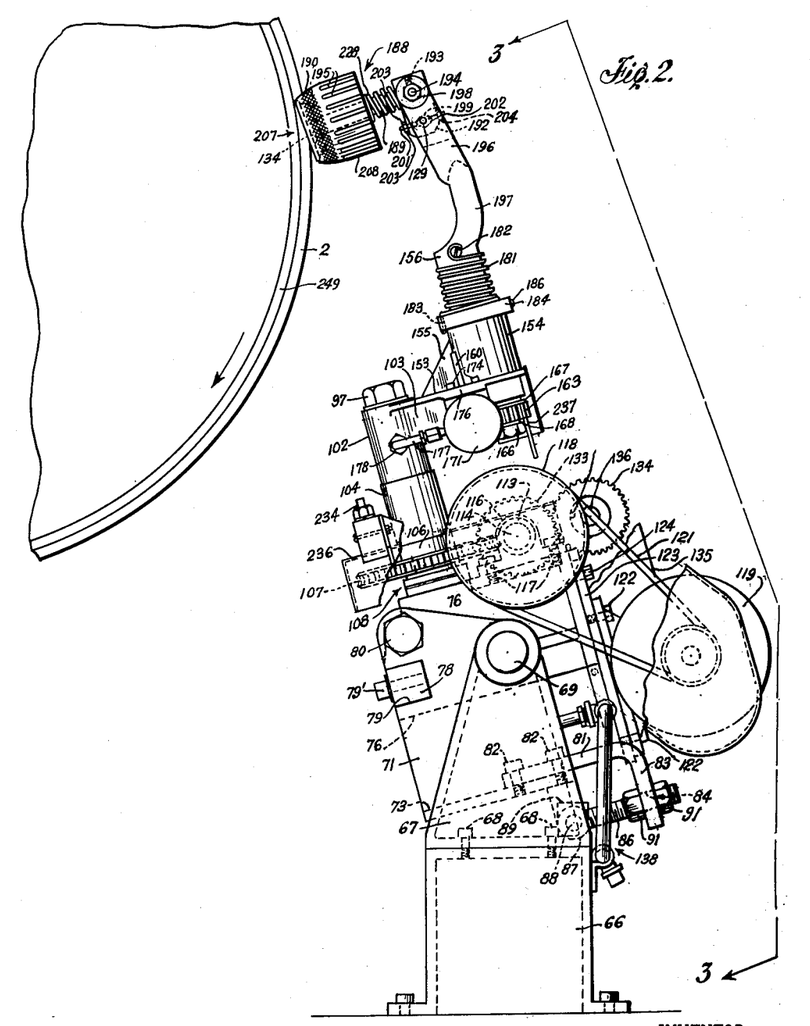
Fig. 2 is an end view of the stitcher mechanism at the rear of the tire building drum.
Figure 3:
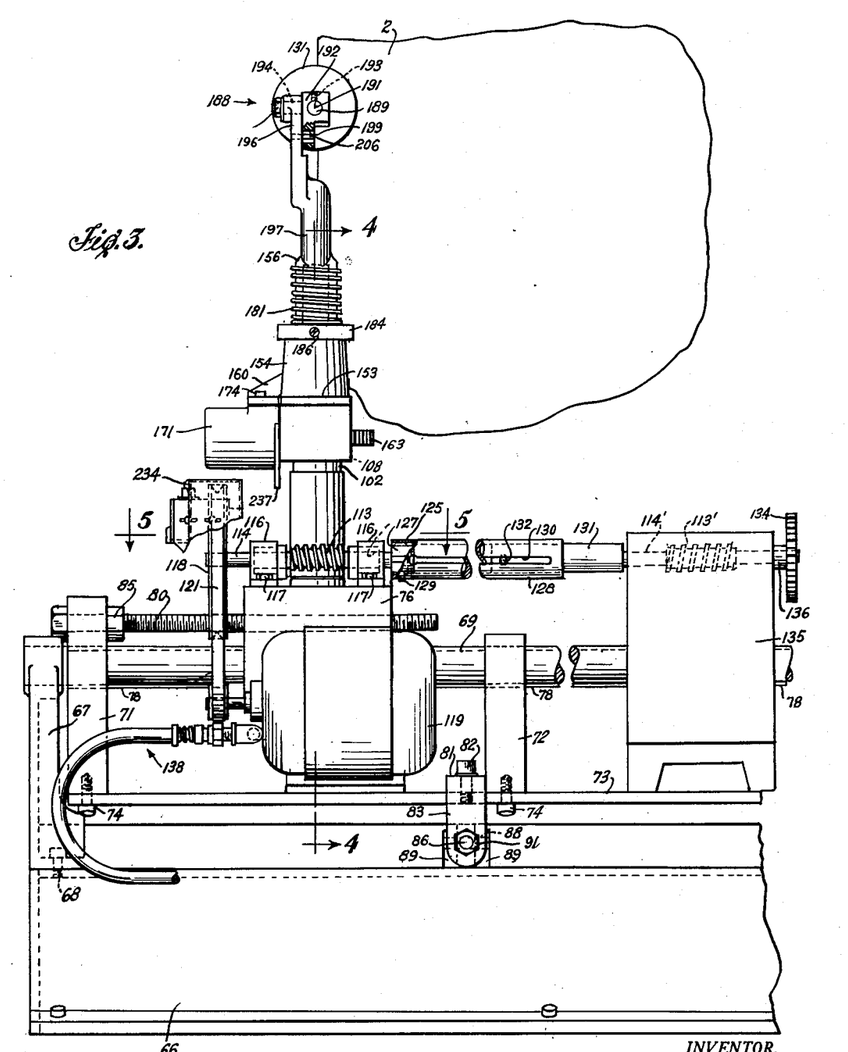
Fig. 3 is a rear view of the stitcher mechanism of Fig. 2 taken on the line 3—3 of Fig. 2.
Figures 4, 5:
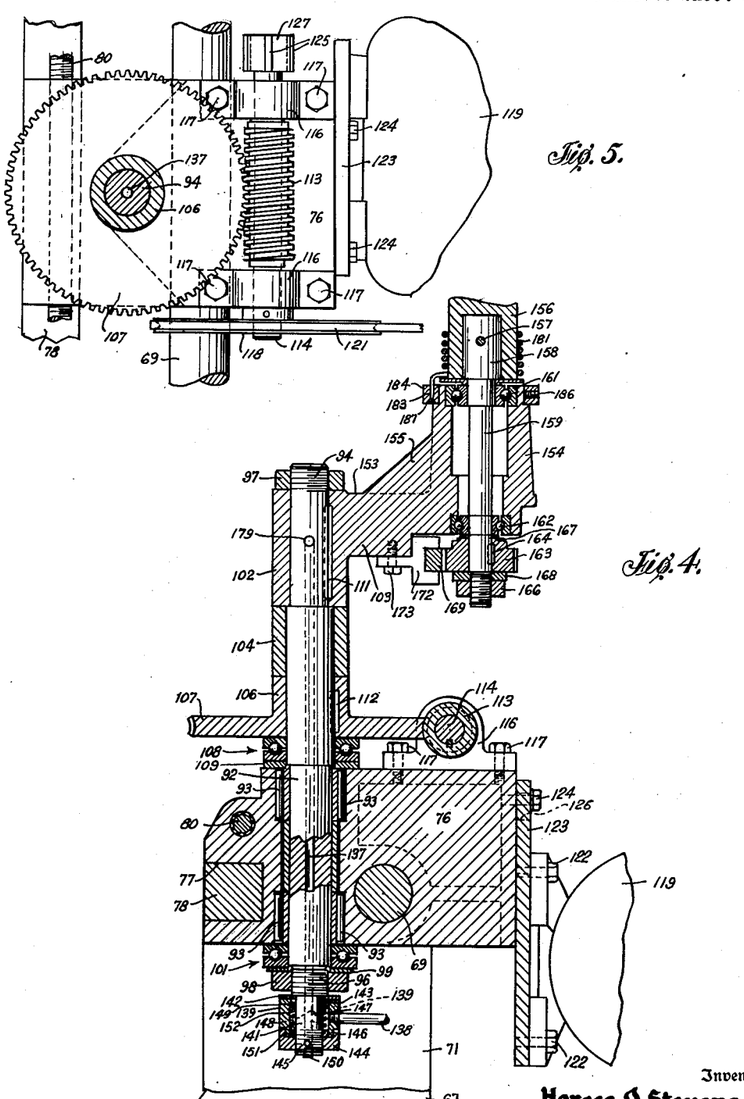
Fig. 4 is a sectional view taken on the line 4—4 of Fig. 3.
Fig. 5 is a sectional view taken on the line 5—5 of Fig. 3.

One of the two stitcher units located rearwardly of the drum is shown in detail in Figures 2 to 4. The two back stitcher units are identical, except for being oppositely arranged for work on opposite edges of the drum, and, therefore, only one need be described. The stitchers are carried on a pedestal 66 extending across the rear of the machine. To the top of the pedestal and at the ends thereof brackets 67 are secured by bolts 68. A shaft 69 is supported in bores in brackets 67 and journaled thereon are brackets 71, at each end of the machine, and a similar bracket 72, at a midway point, the brackets being secured together by a shelf 73 secured to the undersides thereof by bolts 74.

A cast block 76 (Fig. 4), which serves as a support and journal mounting for the stitcher unit, is also carried on shaft 69 and is slidably adjustable along this shaft to accommodate various drum lengths. The block 76 has a slot 77 (Fig. 4) received, for sliding motion of the block, on a bar 78 of rectangular cross section, which is secured in slots 79 in brackets 71, 72 by bolts 79'. Block 76 is thus arranged to rotate in unison with brackets 71, 72 and shelf 73, and may be adjusted along shaft 69 and bar 78 by means of a bolt 80 journaled in bracket 71, threaded in block 76, and provided with a lock nut 85 on the inside of bracket 71.

The mounting of the stitcher support block for rotative movement about shaft 69 provides for adjustment of the inclination of the stitcher with respect to the particular drum being used, and, as will be detailed hereinafter, the angular position of the stitcher is important for operation of the novel stitcher roller of this invention.

For holding the block 76 in adjusted angular position on shaft 69, there is provided a strap 81, which is secured to shelf 73 by bolts 82 and has a downwardly bent portion 83 with a bore 84 received on an adjusting screw 86. The latter has an eye 87 at one end, swiveled on a pin 88, carried by a pair of lugs 89, secured to the upper side of casting 66. Strap arm 83 is held in the desired position on screw 86 by means of a pair of nuts 91 and thus the stitcher-mounting block 76 is locked in the desired angular position.

Referring to Fig. 4, it will be seen that the stitcher unit is mounted in block 76 by means of a shaft 92 rotatable on needle bearings 93 carried in the block. Shaft 92 is threaded, at 94, at its upper end and, at 96, near its lower end, and is secured against axial motion relative to block 76 by means of an upper nut 97 engaging threads 94 and a lower nut 98 engaging threads 96. Between lower nut 98 and the block is a washer 99 and a ball bearing unit 101. Between upper nut 97 and the block are hub 102 of a crank arm 103, a spacer sleeve 104, hub 106 of a worm wheel 107, a ball bearing unit 108, and a washer 109. Hub 102 is keyed to shaft 92 at 111 and hub 106 is keyed to said shaft at 112.

For rotation of stitcher unit shaft 92, worm wheel 107 is driven by a worm 113, mounted on a shaft 114, which is journaled in a pair of bearing blocks 116, secured to the top face of block 76 by bolts 117. Worm shaft 114 has one end extending beyond its bearing block and on the end is keyed a pulley 118. A motor 119 drives pulley 118 through a belt 121. The motor is secured by bolts 122 to a mounting plate 123, which in turn is secured to the back face of block 76 by bolts 124. The latter pass through openings 126 in plate 123, which are of suitable length to permit sliding adjustment of the plate to vary the tension on the motor belt.

Drive is communicated to the other rear stitcher unit through a telescopically arranged shaft system which permits adjustment of the two stitchers axially of the drum. For this purpose, the inner end 127 of worm shaft 114 is enlarged to fit within the end of a drive tube 128, to which it is secured by spline keys 125, for rotary drive, and also by a set screw 129 to prevent axial movement of tube 128. A mating shaft 131 is received in tube 128 and the two are secured, for transmission of rotation, by means of a pin 132 laterally disposed in shaft 131 and extending on either side thereof, and engaging diametrically opposite longitudinal slots 130 in tube 128, which connection permits relative axial motion of the tube and shaft as the stitcher units are adjusted axially of the drum.

Shaft 131 has a reduced portion 114', generally similar to shaft 114, which is likewise mounted in bearing blocks (not shown) and carries a worm 113' for driving a worm wheel on the other stitcher (not shown). Shaft portion 114' carries a gear 133 (Fig. 2) engaging a gear 134 connected with a timer 135 through a shaft 136. The timer, which is of conventional construction, and therefore need not be described in detail, governs the various motions of the rear stitchers.

Referring again to shaft 92, it will be seen that it is axially bored to provide a passage 137 for conveying air under pressure to the upper part of the stitcher, for a purpose presently to be explained. The air is introduced, from an appropriate source, through a conduit indicated generally at 138, which is threaded into the side of a sleeve 139, surrounding a reduced extension 141 on the lower end of shaft 92, a washer 142 being provided between the sleeve and the threads 96. Sleeve 139 has an inwardly directed flange 143 at its upper end, snugly fitted on extension 141, and a lower cap 144 is also fitted on the extension, being secured thereto by a pin 145, and the cap has a ring flange 146 mating with a rabbeted groove in the lower, outer edge of sleeve 139. With this arrangement, sleeve 139 defines an annular chamber 147 about extension 141, which receives air from conduit 138. The lower end of bore 137 is plugged, as at 150, and a lateral bore 148 provides air communication between the bore and annular chamber 147 in all positions of rotation of shaft 92. To avoid leakage of air from chamber 147, there are provided an upper packing ring 149 and a lower packing ring 151, the two being held against the ends of chamber 139 by a helical spring 152.

Crank arm 103 has a flat top 153, at the outer end of which is an upstanding sleeve 154 with its axis parallel to that of shaft 92 and forming a journal for the rotative mounting of a stitcher-supporting standard 156. A strengthening web 155 connects sleeve 154 and top 153. Sleeve 154 is secured by a pin 157 to the enlarged head 158 of a journal shaft 159 mounted on ball bearing units 161, 162, secured in the sleeve 154. A pinion 163 is keyed to the lower part of shaft 159, as at 164, and is secured by a nut 166 on the threaded lower end of the shaft, washers 167, 168 being provided on respective sides of the pinion. The pinion is actuated, to turn the standard 156, by means of a rack 169, secured to the piston of an air cylinder 171, and guided in its sliding motion between the tines of a fork 172, bolted at 173 to the underside of crank arm 103. The air cylinder is bolted at 174 to a lateral arm 176 of the flat top 153 of the crank arm, supporting arm 176 being strengthened by a web 160. Air cylinder 171 is energized through a conduit 177 having a fitting 178 threaded in the wall of hub 102 and communicating with a lateral bore 179 in shaft 92, leading to the axial bore 137 therein.

Figure 15:
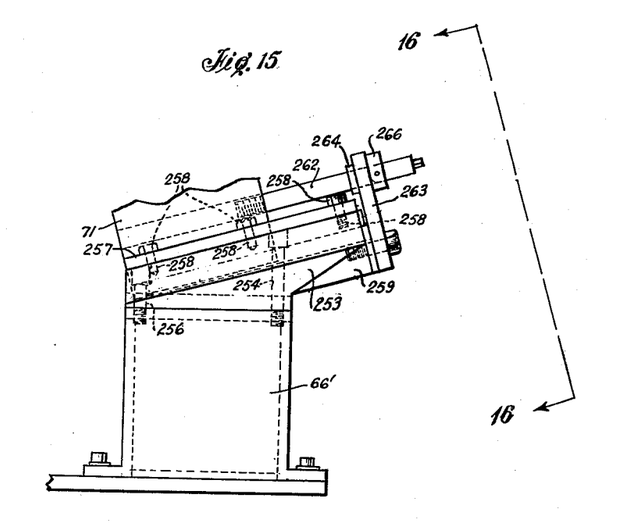
Fig. 15 is an end view of a modified base mounting for the rear stitchers.

Air cylinder 171 is single-acting to move rack 169 inwardly of the plane of Fig. 15, against the resistance of a helical spring 181 surrounding standard 156. The spring is anchored at one end to a screw 182 on standard 156 and, at the other end, in a bore 183 in a collar 184, secured by a set screw 186 to a shoulder 187 on sleeve 154. Upon release of pressure from the air cylinder, standard 156 is reversely rotated to its normal position by spring 181.

The stitcher roller, or "acorn" stitcher (Fig. 6) indicated generally by the numeral 188, is rotatable on a shaft 189 secured in a bore 191 in a block 192 by a set screw 193. Block 192 has a stub shaft 194, rotatably mounted in a bore in the flat, upper end 196 of a curved arm 197 of standard 156, and has a reduced end threaded to receive a securing nut 198, shaft 194 being free to rotate in its mounting. Block 192 has an oblong opening 199 and threadedly receives a pair of adjusting screws 201, 202, adapted to pass into opening 199 and having lock nuts 203, 204. A pin 206, extending laterally from the flat portion 196, extends into opening 199 and thus limits the extent of clockwise and counterclockwise swing of block 192 and stitcher 188, as determined by the setting of screws 201, 202. The limiting values of inclination of stitcher 188 are significant in the operation of the stitcher, as will be explained. In one such position, shaft 189 is aligned with a radius of drum 2 and, in the other, it makes an angle of about 8° therewith.

Stitcher roller 188 comprises two sections, indicated generally by the numerals 207 and 208, mounted in tandem on shaft 189, each independently rotatable about said shaft and section 208 being movable axially of the shaft, while section 207 is fixed against motion axially of the shaft and limits outward sliding of section 208.

End section 207 comprises a ring 209 having a bead 211 and an inner, reduced skirt portion 212 receivable in the open end of section 208. Ring 209 is secured to the outer race of anti-friction bearings 213 by means of screws 214 and an inner clamping ring 216; and the inner race of the bearings is secured on a reduced end of shaft 189 by means of a washer 217 and a central screw 218 threaded into shaft 189.

The larger section 208 of the stitcher is also of generally ring form and has an axial counterbore 219 receiving the outer races of anti-friction bearings 221, 222, the inner races of which are snugly fitted on shaft 189 and slidable therealong. The bearings are spaced apart by a sleeve 223 and the entire bearing assembly is locked in place in the stitcher by the heads of screws 224 threaded into the recessed rear face of this stitcher section.

Another counterbore 226 in the front end of roller 208 is adapted to receive the skirt 212 of roller 207 and has a curved opening 227 at its front rim to receive bead 211 in mating relation, so that the two rollers merge in outer profile, and form, in effect, one roller. This is the position which roller 208 normally assumes under the urging of a coil spring 228 surrounding shaft 189, and acting against block 192 and a spacer ring 229 located behind the inner race of bearing 222.

Preferably, the large stitcher element 208 will have a roughened surface, as by knurling 190, so as to afford more positive contact with the plies and avoid slipping, which might result in pleats or folds. Axially directed flutes 195 have also proved beneficial in attaining a smooth stitching operation, free from faults. In general, various schemes and patterns in the roughening of the stitcher surface will be found beneficial.

In the building of a tire, the operator will first place a bead on carrier 7 and may at such time, or later in the process, place a bead on carrier 32. The end of the first ply is then led from its supply roll to drum 2 and pressed into adhesive engagement therewith. The operator then steps on a foot switch 138 leading to suitable controls whereby the drum is rotated 360°, drawing the ply into position on the drum, and thereupon rotation of the drum ceases automatically. The edges of the plies are then brought together in abutting relation to form a complete ply circle, and the process is repeated for the second ply. These two plies are known as the "underbead" plies and their edges extend beyond the edges of the drum.

Figure 8:
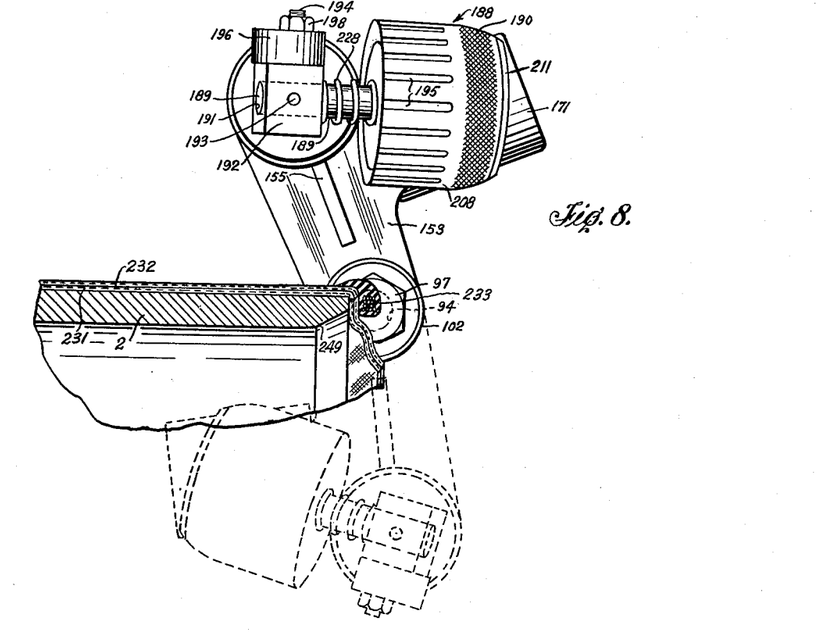

Air cylinder 57 is then actuated to carry spring stitchers 56 into engagement with the ply ends and the latter are thereby folded over the edges of the drum to assume a position as shown in Fig. 8, wherein the first and second plies are indicated, respectively, by the numerals 231, 232. The spring stitchers are then removed from the drum by air cylinder 57. Next, the bead appliers 7 and 32 are actuated by their respective air cylinders to lay the beads over the edge of the drum, onto second ply 232, as shown in Fig. 8, the bead being indicated by 233.

Turn-up of the first two plies, that is, encasement of the bead, is accomplished by the rear stitchers, which have just been described, in the following manner. After the bead is applied, motor 119 is started, through an appropriate switch, and, through worm 113 and worm wheel 107, crank arm 103 is swung from its normal position of rest, as viewed in Fig. 8 where it lies outside of the periphery of the drum, clockwise, about the axis of shaft 92, to a position where stitcher 188 is located interiorly of the drum, the rotation being interrupted by appropriate controls in the timer 136. In order to prevent overrunning of the stitcher unit in this rearward swing, a safety device is provided in a limit switch 234 carried on a guard element 236 which shields the worm wheel 107, the switch being contacted by a dependent arm 237 on crank arm 103 of the stitcher to stop motor 119 if for any reason the crank arm passes beyond the proper limit of travel.

Figure 9:
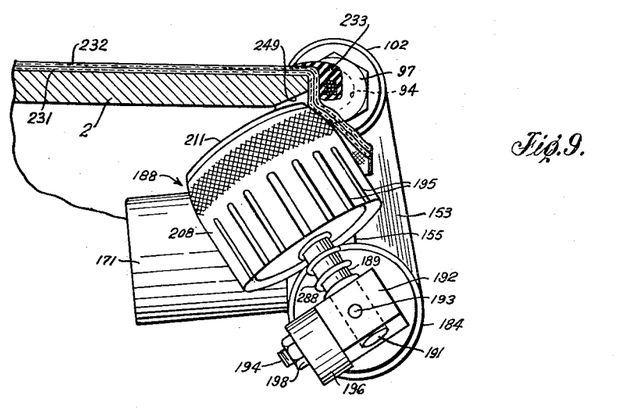
Figure 10:
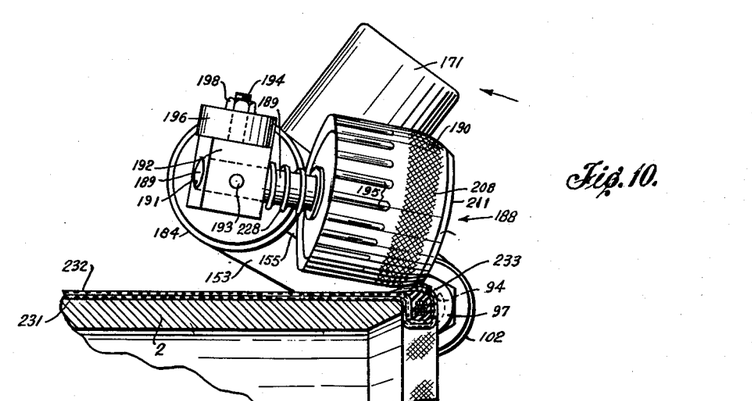
Figure 11:
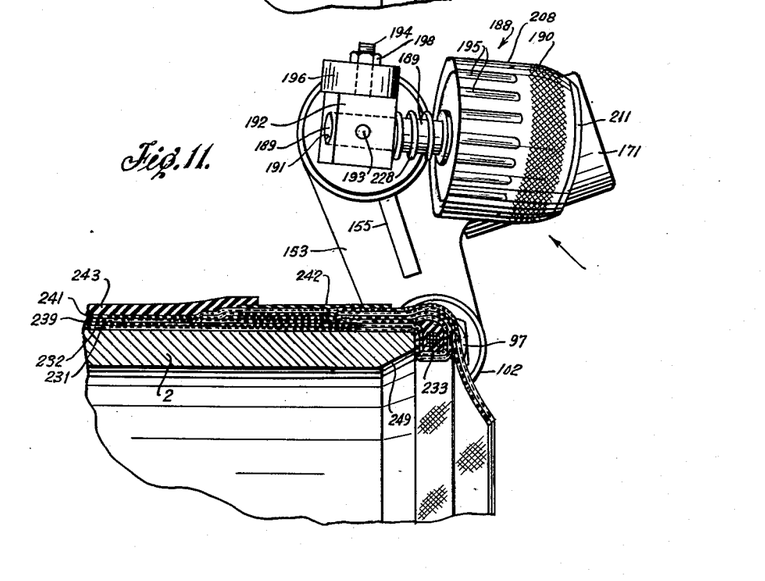

In this movement the stitcher is merely being positioned for the turn-up operation, and its path of movement is such as to clear the free edges of the plies. Therefore, at the end of this inward swing, the stitcher is positioned in spaced relation to its working point, as seen in the dotted line position in Fig. 8, and it must be brought into contact with the work to accomplish the turn-up. The required movement of the stitcher to its working position is accomplished by rotation of standard 156 in sleeve 154. Thus, when the crank arm has reached its inward limit of travel, the timer initiates air pressure through shaft 92 to air cylinder 171 and standard 156 rotates in its mounting, against the pressure of spring 181, to a position, as shown in Fig. 9, where it urges the plies against the tire bead. Prior to this action, the drum has been set in rotation in the direction indicated by the arrow in Fig. 6 by means of a foot switch 233. After contact by the stitcher, motor 119 is set in rotation by the timer, to return crank arm 103 to its normal position outwardly of the drum. The axis of shaft 92 is on a line substantially tangent to the drum and generally in the plane of the bead, so that stitcher 188 remains in close, pressure contact with the bead, through the plies, to bring them into firm engagement with the bead and enclose the latter, as shown in Fig. 10. At the position of the stitcher shown in the latter figure, pressure is removed from air cylinder 171 by the timer and the stitcher standard 156 revolves in sleeve 154 under the urging of coil spring 181, to move the stitcher away from the drum, to its original position, as shown in Fig. 11.

Figures 6, 7:
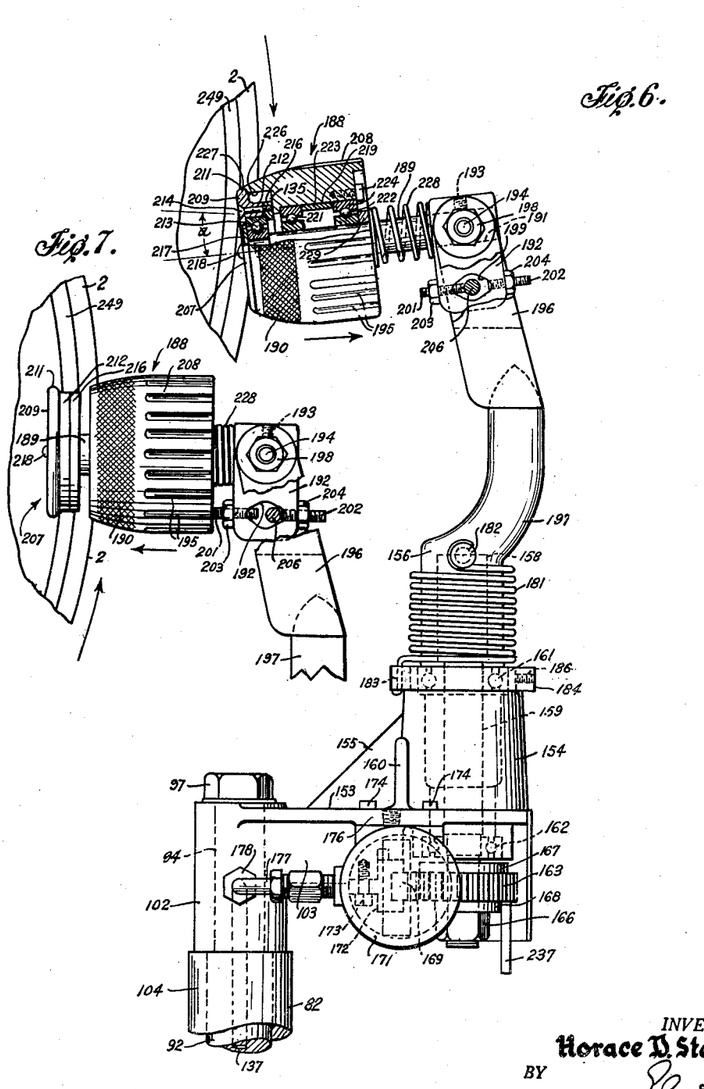
Fig. 6 is an enlarged view of the upper portion of the stitcher mechanism of Fig. 2, showing one phase of operation thereof in its relation to direction of rotation of the tire building drum.
Fig. 7 is a fragmentary view showing the roller stitcher of Fig. 4 in another phase of operation thereof in its relation to the direction of rotation of the tire building drum, Figs. 8 to 13, inclusive, are fragmentary views showing successive phases of operation of the roller stitcher of Figs. 2 to 5 and the ply-turning operations accomplished in each case.

In the stitching operation just described, it is the large element 208 of the stitcher which is employed. Referring to Fig. 6, it will be seen that the direction of rotation of drum 2 and the direction of movement of the stitcher are such as to urge shaft 189 downward, so that pin 206 is contacted by limit screw 201, and shaft 189 makes an angle with a radius of the drum, as indicated by the character a. It has been found that this angle should be of the order of 8°. This urges stitcher element 208 constantly against element 207 and the latter does not enter into this phase of the stitching, except insofar as it may be considered as a continuation of element 131.

The drum ceases rotation upon removal of the operator's foot from switch 238. The third and fourth plies 239, 241 are then taken from their respective supply rolls and placed on the drum in succession, and the chafer strips 242 and tread strips 243 are thereafter taken from the storage rack and placed on the drum. In the placing of the tread on the drum, a centering device 244, pivoted on a bracket 246 on the apron 24 for swinging motion and having a guide wheel 247, will be employed, as understood in the art.

Thereafter, air cylinders 47 are actuated to bring stitcher discs 44 into contact with the tread at the center thereof and screw 49 is rotated so that the respective discs 44 move in opposite directions across the tread while maintaining pressure thereon. As discs 44 pass the high points of the central, thick band of the tread, the stitching pressure is likely to diminish if the rate of motion of the discs axially of the drum is maintained. Therefore, the switch 54 is provided to effect lowering of the speed of rotation of screw 49. When discs 44 reach the outer margins of the tread strip, limit switch 55 reverses air cylinders 47, so that discs 44 are lowered away from the drum, and screw 49 is rotated in the reverse direction to return the stitchers to their idle position centrally of the drum, whereupon rotation of the screw is stopped by a limit switch (not shown).

At this point, the tread is trimmed, if necessary, and for such purpose any convenient form of trimmer may be employed. However, the present trend is to provide tread strips of accurate dimensions, so that the need for trimmers is eliminated.

Figures 12, 13, 14:
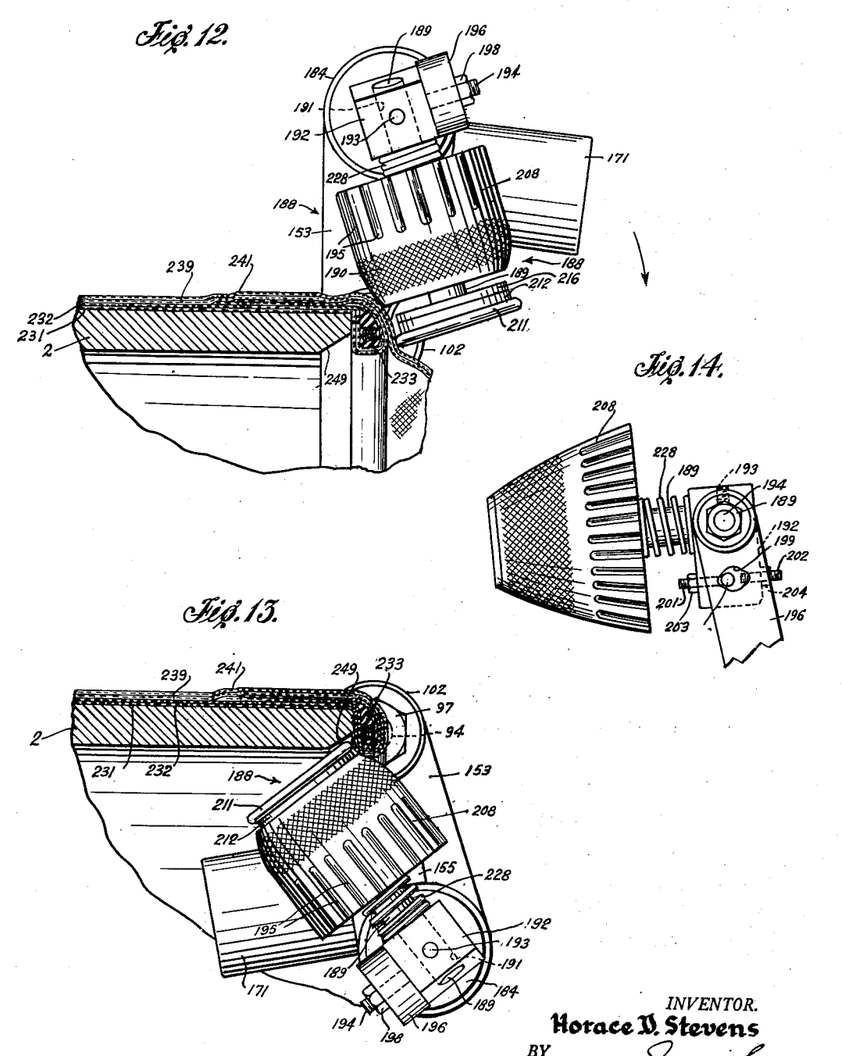

The next step is the turn-down of the third and fourth, or so-called "over-bead" plies, which, up to this point, have been extending from the ends of the drum. The turn-down is initiated by roller 62 on spring stitcher unit 56, which carries the plies half way across the bead to the position shown in Fig. 11, the drum rotating in a direction as shown in Fig. 7, as initiated by a foot pedal switch 248. Thereafter, air cylinder 171 is actuated to rotate standard 156 in sleeve 154, to bring the rim 211 of end roller 207 of the stitcher into contact with the plies, and motor 119 is actuated to move the stitcher around the bead, in pressure contact with the outer ply, in a direction reverse to that of the first stitching operation by this stitcher. As seen in Fig. 7, the direction of rotation of the drum and the direction of movement of the stitcher are such as to swing shaft 189 upward until pin 206 is contacted by stop screw 202, in which position the axis of shaft 189 is substantially aligned with a radius of drum 2. The combined effect of the direction of rotation of the drum and of the angular position of shaft 189 is such that, during travel of the stitcher inwardly across the bead, element 208 of the stitcher, due to contact with the plies, recedes along shaft 189 against the pressure of spring 228, and the stitching operation is performed by the thus exposed rim or bead 211 of end element 207 of the stitcher (Figs. 12 and 13). This not only affords a more effective stitching operation for this particular phase of the process, but also enables stitching in close quarters, inwardly of the drum where the plies terminate, as shown in Fig. 13. It will be noted that the inner edge of the drum rim is beveled, as at 249, to provide more clearance for the stitcher.

Figure 16:
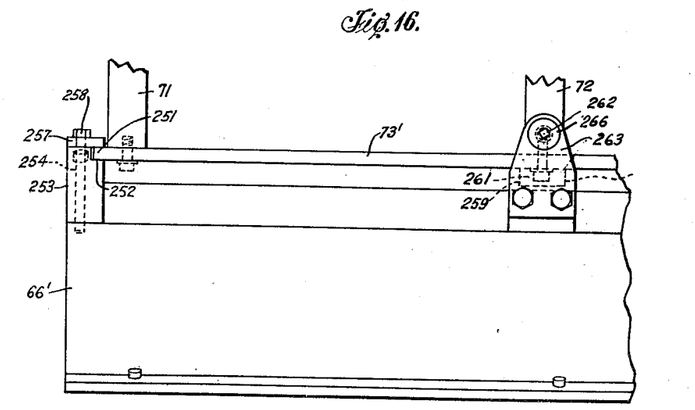
Fig. 16 is a partial rear view of Fig. 15, taken on the line 16—16 of Fig. 15.

The swinging adjustment of the rear stitchers about shaft 69, by nuts 91, to accommodate different sizes of drums, necessitates a re-setting of stop screws 201, 202 to maintain the proper limiting values of the angle of stitcher shaft 189 with respect to the drum radius. In order to avoid the necessity for such adjustment, the stitcher assembly may be mounted for sliding motion to and from the drum, rather than swinging motion. Such an arrangement is shown in Figs. 15 and 16. In this modification, the shelf 73', corresponding to shelf 73, has its ends extended beyond end brackets 71, as at 251, and the extending ends are received for sliding motion in grooves 252, in slanted brackets 253, secured by bolts 254, 256 to a base pedestal casting 66' corresponding to base 66 in the first-described arrangement. Grooves 252 may be conveniently provided by a top bar 257, secured by bolts 258 to bracket 253 and overhanging an inner rabbeted edge on the latter.

A central bracket 259 of channel form on base 66', slanted similarly to brackets 253, accommodates a bar 261 secured on the underside of shelf 73' for sliding motion. Shelf 73' and the stitcher mechanism carried thereby are moved parallel to grooves 252 and the channel in bracket 259 by means of a screw 262 mounted for rotation in a bracket 263 bolted to the end of bracket 259, the screw being threaded into central bracket 72, of shelf 73', and secured against axial motion with respect to bracket 263 by collars 264 and 266.

It will be seen that turning of adjusting screw 262 results in movement of shelf 73' parallel to the grooves 252 of brackets 253. The direction of grooves 252 is parallel to that of the axis of shaft 189 when the latter is aligned with a radius of drum 2. Therefore, in adjusting the stitcher assembly to accommodate a different drum size, the angular relation of shaft 189 to the drum radius is unchanged and no adjustment of limit screws 201, 202 is necessary.

In the modification just described, no changes in those parts of the stitcher assembly above shelf 73 are necessary. Shaft 69 and bar 77 still function to give a pair of spaced supports which maintain the stitcher units against turning with respect to shelf 73'.

In Fig. 14 is shown a modified form of stitcher for use on the mounting of Figs. 2 and 3. In this form, the shape is varied somewhat, the outer end being less in diameter and the rear end greater in diameter than the stitcher first described. It has been found by experiment that no one shape of stitcher gives optimum performance for all types and sizes of tire. In particular, it has been found that the flared shape shown in Fig. 14 performs better on larger sized tires than does one similar in shape to stitcher 188.

While a certain preferred embodiment of the invention has been shown and described, the invention is not limited thereby, since changes in the size, shape, and arrangement, for instance, of the various parts may be resorted to without departing from the spirit or scope of the appended claims.

What is claimed is:

1. In combination, a tire building drum mounted on a central hub; a bead applying element mounted on an upright arm on a mounting slidable axially of the said drum, and telescoping means located axially on the drum and axially on said element for centering said element when in proximity to said drum.

2. A stitcher unit for tire building machines comprising a journal mounting, a crank arm journaled in said mounting, a standard on said crank arm, a shaft mounted on said standard for swinging motion, and a stitcher tool mounted for rotation on said shaft and having a portion lying substantially on the line of the axis of said journal mounting.

3. A stitcher unit for tire building machines comprising a journal mounting, a crank arm journaled in said mounting, a standard mounted for rotation on said crank arm, a shaft mounted on said standard for swinging motion about an axis generally transverse to said standard, and a stitcher tool mounted for rotation on said shaft and having a portion lying substantially on the line of the axis of said journal mounting.

4. A stitcher unit for tire building machines comprising a journal mounting, a stitcher arm mounted for rotation in said mounting, and a stitcher tool on said arm mounted for rotation about an axis generally transverse to the axis of said journal mounting, said arm having a portion offset from the axis of said journal mounting and said tool having a portion substantially on the line of the axis of said journal mounting.

5. A stitcher unit for tire building machines comprising a journal mounting, a stitcher tool mounted for rotation about an axis generally transverse to the axis of said mounting, spaced from the end of said mounting, and having a portion substantially on the line of the axis of said mounting, means rotatably mounted in said mounting and connected to said stitcher tool, and said means having a portion offset from the line of the axis of said mounting.

6. A stitcher unit for tire building machines comprising an element adapted for journaled mounting, means mounting a stitcher tool for rotation about an axis generally transverse to the journal axis of said mounting, said tool having a portion on the line of the said journal axis and spaced from said mounting, and means connecting the said element and said tool, said latter means having a portion offset from the journal axis of said mounting.

7. A stitcher unit for tire building machines comprising an element adapted for journaled mounting, a stitcher tool, means mounting said tool for rotation about an axis generally transverse to the journal axis of said mounting, said tool having a portion on the line of the said journal axis and spaced from said mounting, means connecting the said element and said tool, said latter means having a portion offset from said journal axis, and said first-mentioned means being mounted for limited angular swing about an axis transverse to said journal axis and to the axis of rotation of said tool.

8. A stitcher unit for tire building machines comprising an element adapted for journaled mounting and thus defining an axis of rotation, a stitcher tool spaced from said element and having a portion on the line of the rotation axis thereof, means mounting said tool for rotation about an axis transverse to the axis of said journaled mounting, said means mounted for limited swinging about a third axis transverse to each of said other axes, and means connecting the said tool and its mounting with the said element, said latter means having a portion offset from the line of the axis of said journaled mounting, and said tool comprising two parts, arranged for relative displacement axially of the mounting means thereof.

9. A stitcher unit for tire building machines comprising an element adapted for journaled mounting, and thus defining an axis of rotation, a stitcher tool spaced from said element and having a portion on the line of the axis thereof, said tool comprising two co-axially rotatable elements arranged in tandem, means mounting said latter elements for rotation, one of said rotatable elements being movable axially of said means, resilient means urging the movable element to a normal position on its mounting means, said mounting means arranged for limited swinging motion about an axis transverse to the axis of said first-mentioned element, and means connecting the mounting means of said tool with the first mentioned element and having a portion offset from the line of the axis of said first-mentioned element.

10. A stitcher unit for tire building machines comprising a shaft, a first roller stitcher mounted on the shaft, a second roller stitcher mounted on the shaft, arranged for sliding motion along said shaft, resilient means normally urging said second roller stitcher into contact with said first roller stitcher, means mounting said shaft for limited angular swing of said roller stitchers about an axis transverse to the axis of said shaft, said latter means adapted for journaled mounting on an axis transverse to the axis of said shaft and the axis of swing of said rollers.

11. A unit as in claim 10, the means mounting said shaft being substantially offset from the axis of said journaled mounting.

12. A stitcher unit for tire building machines comprising a crank arm, a stitcher support journaled in said crank arm, a shaft pivoted on said support for swinging motion about an axis transverse to the axis of turning of said support, and a roller stitcher mounted for rotation on said shaft.

13. A stitcher unit for tire building machines comprising a crank arm, a stitcher support journaled in said crank arm, a shaft pivoted on said support for limited swinging motion about an axis transverse to the axis of turning of said support, a first stitcher tool mounted for rotation on said shaft, and a second stitcher tool mounted for rotation on said shaft, located between the said first stitcher tool and the pivoted end of the shaft, and arranged for sliding motion along said shaft.

14. In a stitcher unit as in claim 13, means to rotate said support, and resilient means opposing rotation of said support.

15. In a stitcher unit as in claim 13, resilient means opposing sliding motion of said second stitcher tool toward the pivoted end of said shaft.

16. A stitcher tool for tire building machines comprising a shaft, a first stitcher tool mounted for rotation on said shaft, and a second stitcher tool freely mounted for rotation on said shaft and for sliding motion along said shaft.

17. A stitcher tool comprising a supporting arm, a shaft pivoted on said arm for limited swinging motion and extending generally transversely of said shaft, a first stitcher tool mounted for rotation on said shaft, and a second stitcher tool freely mounted for rotation on said shaft and for sliding motion along said shaft.

18. In combination, a tire building drum, a support for a stitcher unit, a crank arm spaced from said drum and journaled for rotation on said support on an axis generally tangentially of said drum, an arm journaled in said crank arm on an axis generally parallel to but spaced from the first-mentioned axis, a shaft pivoted on said arm for limited swinging about an axis generally transverse to the other two said axes, a first stitcher mounted for rotation on said shaft, a second stitcher mounted for rotation on said shaft and slidable therealong, and spring means urging said second stitcher toward said first stitcher, said stitchers being positioned to contact a rim of said drum.

HORACE D. STEVENS.

REFERENCES CITED

The following references are of record in the file of this patent:

UNITED STATES PATENTS

| Number | Name | Date |
|---|---|---|
| 1,415,724 | Sloman | May 9, 1922 |
| 1,677,871 | Putt | July 17, 1928 |
| 2,161,117 | Wikle | June 6, 1939 |
| 2,381,379 | Stevens | Aug. 7, 1945 |
| 2,409,974 | Breth et al. | Oct. 22, 1946 |